United States Patent [19]

Kato

[11] Patent Number: 4,895,229
[45] Date of Patent: Jan. 23, 1990

[54] HYDRAULIC SHOCK ABSORBER

[75] Inventor: Tetsuo Kato, Kanagawa, Japan

[73] Assignee: Tokico Ltd., Kanagawa, Japan

[21] Appl. No.: 291,298

[22] Filed: Dec. 28, 1988

[30] Foreign Application Priority Data

Dec. 28, 1987 [JP] Japan .................. 62-199860

[51] Int. Cl.$^4$ ............................. F16F 9/348
[52] U.S. Cl. ................... 188/282; 188/280; 188/322.15; 188/317
[58] Field of Search ........... 188/282, 281, 280, 322.15, 188/322.13, 322.14, 322.22, 317, 316, 318; 137/493, 493.1, 493.7, 493.8, 493.9, 513.3

[56] References Cited

U.S. PATENT DOCUMENTS

| | | | |
|---|---|---|---|
| 2,732,039 | 1/1956 | Funkhouser et al. | 188/282 |
| 3,756,357 | 9/1973 | Graff et al. | 188/317 X |
| 3,991,862 | 11/1976 | Tanabe . | |
| 4,034,860 | 7/1977 | Leppich | 188/322.13 X |
| 4,060,155 | 11/1977 | Duckett | 188/317 X |
| 4,113,072 | 9/1978 | Palmer . | |
| 4,114,735 | 9/1978 | Kato . | |
| 4,191,281 | 3/1980 | Nishikawa et al. . | |
| 4,203,507 | 5/1980 | Tomita et al. | 188/282 X |
| 4,401,196 | 8/1983 | Grundei | 188/322.14 X |
| 4,460,074 | 7/1984 | Müller et al. | 188/322.14 |
| 4,512,447 | 4/1985 | Miura | 188/322.15 |
| 4,561,524 | 12/1985 | Mizumukai et al. . | |
| 4,610,332 | 9/1986 | Mourray . | |
| 4,635,765 | 1/1987 | Schmidt . | |
| 4,721,130 | 1/1988 | Hayashi . | |

FOREIGN PATENT DOCUMENTS

| | | |
|---|---|---|
| 28608 | 1/1961 | Fed. Rep. of Germany . |
| 2910381 | 10/1979 | Fed. Rep. of Germany ............ 188/322.13 |
| 2917958 | 1/1980 | Fed. Rep. of Germany ...... 188/282 |
| 2248442 | 5/1975 | France .................. 188/282 |
| 2608243 | 6/1988 | France .................. 188/322.22 |
| 0014182 | 2/1977 | Japan .................... 188/317 |
| 58-163843 | 9/1983 | Japan . |
| 60-16031 | 2/1985 | Japan . |
| 60-129442 | 7/1985 | Japan . |
| 61-180035 | 8/1986 | Japan . |

Primary Examiner—Douglas C. Butler
Attorney, Agent, or Firm—Wenderoth, Lind & Ponack

[57] ABSTRACT

A hydraulic shock absorber has a disk valve assembly which is formed by successively stacking up a first disk valve having arc-shaped or circumferentially extending opening provided therein at positions close to the inner periphery thereof, a second disk valve having notches which extend from the outer periphery thereof to the radially outer edges of the corresponding openings provided in the first disk valve, and a predetermined number of annular third disk valves. A respective such disk valve assembly is provided at the downstream end of each of the extension- and contraction-side passages which are formed in a piston. Thus, it is possible to obtain a higher level of damping force in a low piston speed region than in the case of a conventional valve mechanism that uses a fixed orifice, and damping characteristics can be set as desired.

3 Claims, 3 Drawing Sheets

HYDRAULIC SHOCK ABSORBER

BACKGROUND OF THE INVENTION

1. Field of the Invention

The present invention relates to a hydraulic shock absorber for use in, for example, a suspension system of an automobile.

2. Description of the Prior Art

A conventional mechanism for generating damping force will first be explained with reference to FIGS. 1 to 3 which show in combination a typical example of a conventional hydraulic shock absorber.

An outer casing 1 is tightly closed at the upper and lower ends thereof by means of upper and lower covers 2 and 3, and a cylinder 4 is provided inside the outer casing 1. A piston 5 is slidably received in the cylinder 4 so that the piston 5 is reciprocatable. A piston rod 6 is connected to one end of the piston 5. The other end of the piston rod 6 extends through the upper cover 2 and projects outside the outer casing 1. At the mutual upper end of the outer casing 1 and the cylinder 4 are provided a rod guide 7 for guiding the rod 6 and a seal member 8 for hermetically sealing the inside of the cylinder 4.

The following is a description of a conventional valve mechanism 9 which is provided on the piston 5 to generate damping force.

In general, the valve mechanism 9 of this type comprises a plurality of flexible disk valves 10 which are laid one on top of another, a valve seat 11 on which the stack of disk valves 10 rests, and a combination of a valve retainer 12 and a spring member 13 for biasing the disk valves 10 toward the valve seat 11. Two disk valves 15 and 16 which are disposed underneath the stack of disk valves 10 are arranged to define a fixed orifice 14. The upper disk valve 15 is provided with a U-shaped notch 15a which extends from the outer periphery toward the axial center thereof, while the lower disk valve 16 is formed in the shape of a ring.

A gap 17 which is formed between the disk valves 10, 15 and 16 when laid one on top of another is defined as an opening of the orifice 14.

The function of the valve mechanism 9 will next be explained. As the hydraulic shock absorber extends, oil flows from an oil chamber A defined at the upper side of the piston 5 to an oil chamber B defined at the lower side of the piston 5. At this time, when the speed of movement of the piston 5 is relatively slow, damping force is generated by virtue of the throttling function of the fixed orifice 14, whereas, when the speed of the piston 5 is relatively fast, the inner peripheral portion of the stack of disk valves 10, 15 and 16 is bent so as to generate damping force.

The above-described prior art arrangement suffers, however, from the following problems. With the valve mechanism 9, when the speed of the piston 5 is relatively slow, that is, before the inner peripheral portion of the stack of disk valves 10 is bent, damping force is provided by the fixed orifice 14 alone and the change of the damping force in the relatively slow piston speed region takes the form of a quadratic curve such as that shown in FIG. 3. Therefore, if the level of damping force at the piston speed immediately before the inner peripheral portion of the stack of valves 10 is bent, e.g., at the point A, is set at an optimal value, the level of damping force at the point B at which the piston speed is lower than that at the point A is below the desired value, so that the conventional hydraulic shock absorber cannot exhibit its function to the full in this piston speed region.

SUMMARY OF THE INVENTION

In view of the above-described problems of the prior art, it is a primary object of the present invention to provide a hydraulic shock absorber which is so designed that it is possible to set the level of damping force at an optimal value in a low piston speed region.

To this end, the present invention provides a hydraulic shock absorber including a cylinder containing a hydraulic fluid, a piston slidably received in the cylinder so as to define two fluid chambers inside the cylinder, a piston rod rigidly secured at one end thereof to the piston, the other end of the piston rod extending outside the cylinder, and a damping force generating mechanism attached to the piston, wherein the damping force generating mechanism comprises first and second passages formed in the piston such that each of the first and second passages is communicated with one of the two fluid chambers and an opening formed in the end face of the piston which faces the other fluid chamber, a first disk valve assembly mounted on one end face of the piston and arranged to close the first passage, and a second disk valve assembly mounted on the other end face of the piston and arranged to close the second passage, each of the disk valve assemblies comprising a first disk valve mounted on an end face of the piston, the first disk valve having an opening which is communicated with the opening formed in this end face of the piston, and a second disk valve mounted on the first disk valve, the second disk valve having a fluid passage which is formed such that one end thereof is opened to the fluid chamber defined at the side of the piston where the second disk valve is disposed and the other end thereof is opened to the interfacial area between the second disk valve and the first disk valve.

In one embodiment of the present invention, the fluid passage is defined by a notch which is formed in the second disk valve and the disk valve assembly further has a third disk valve which is mounted on the second disk valve.

BRIEF DESCRIPTION OF THE DRAWINGS

The above and other objects, features and advantages of the present invention will become more apparent from the following description of the preferred embodiment thereof, taken in conjunction with the accompanying drawings, in which like reference numerals denote like elements, and in which.

DESCRIPTION OF THE PREFERRED EMBODIMENT

One embodiment of the present invention will be described hereinunder in detail with reference to FIGS. 4 to 7.

Figure 1:
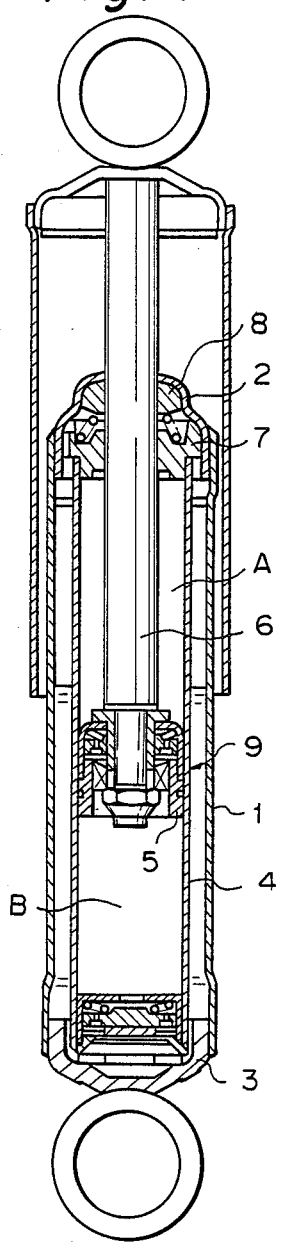
FIG. 1 is a longitudinal sectional view showing one example of conventional hydraulic shock absorbers.
Figure 2:
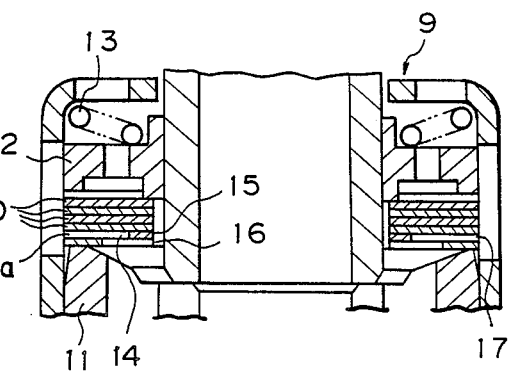
FIG. 2 is a fragmentary sectional view of the valve mechanism of the hydraulic shock absorber shown in FIG. 1.
Figure 3:
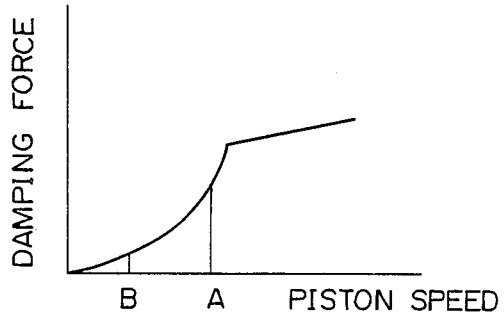
FIG. 3 is a chart showing the characteristics of the valve mechanism illustrated in FIG. 2, which shows the relationship between the piston speed and the damping force.
Figure 4:
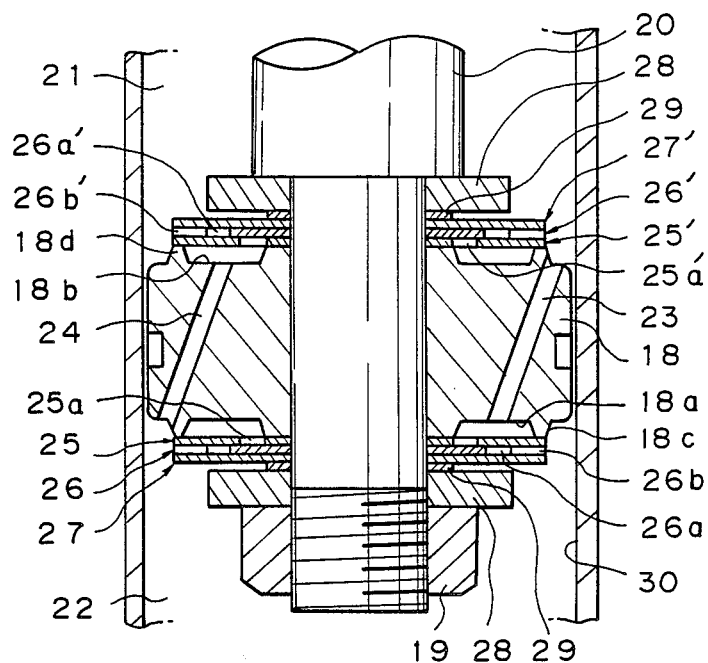
FIG. 4 is a fragmentary sectional view showing the valve mechanism of one embodiment of the hydraulic shock absorber according to the present invention.

The arrangement of this embodiment first will be explained with reference to FIG. 4. A cylinder 30 has a piston 18 slidably received therein, and a piston rod 20 is secured to the piston 18 by means of a nut 19. The piston 18 defines a first cylinder chamber 21 and a second cylinder chamber 22 inside the cylinder 30.

The piston 18 is provided with an extension-side passage 23 and a contraction-side passage 24. The downstream ends of the passages 23 and 24 open into annular grooves 18a and 18b, respectively. The grooves 18a, 18b and annular projections 18c, 18d which are provided at the outer peripheries thereof respectively define seat surfaces.

Figures 5, 6:
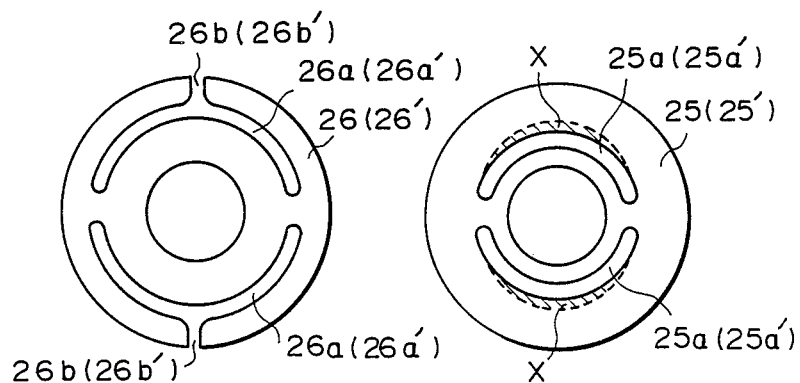
FIG. 5 is a plan view of the second disk valve shown in FIG. 4.
FIG. 6 is a plan view of the first disk valve shown in FIG. 4.

On each seal surface is provided a disk valve assembly comprising a first disk valve 25 (25') having arc-shaped or circumferentially extending openings 25a (25a') provided therein at positions close to the inner periphery thereof, as shown in FIG. 6, a second disk valve 26 (26') having arc-shaped or circumferentially extending openings 26a (26a') provided therein positions close to the outer periphery thereof and notches 26b (26b') which extend from the outer periphery to the corresponding openings 26a (26a'), as shown in FIG. 5, and an annular third disk valve 27 (27'), the first, second and third disk valves being laid one on top of another in the mentioned order. Each of the disk valves 25, 25', 26, 26', 27 and 27' is formed using a flexible material.

Since the openings 25a (25a') and 26a (26a') which are respectively provided in the first disk valve 25 (25') and the second disk valve 26 (26') are offset from each other in the radial direction, the combination of the first and second disk valves 25 (25') and 26 (26') is capable of closing the passage 23 (24) when they are in place one on top of another. Further, the portions X (i.e., the hatched portions shown in FIG. 6) of the first disk valve 25 (25') which are at the radially outer sides of the openings 25a (25a') are bent by the force of oil flowing into the openings 26a (26a') provided in the second disk valve 26 (26'), thus opening the valve.

It should be noted that the reference numerals 28 and 29 denote a spacer and a securing member for securing the stack of disk valves 25, 26 and 27 (25', 26' and 27').

The following is a description of the operation of the embodiment having the above-described arrangement.

Since the operations that are performed during the extension and contraction strokes are basically the same, the following description only refers to the operation carried out during the extension stroke.

As the piston 18 rises, the level of pressure in the first cylinder chamber 21 rises, so that the oil flows into the extension-side passage 23. When the speed of the piston 18 is in a low speed region, the pressure of the oil will not reach the level at which the disk valves 25, 26 and 27 provided at the downstream end of the extension-side passage 23 would be opened by virtue of the oil pressure. At this time, however, the oil flowing into the openings 26a' through the notches 26b' provided in the second disk valve 26' which is provided at the downstream end of the contraction-side passage 24 causes the portions X at the radially outer sides of the openings 25a' provided in the first disk valve 25' to bend such as to open the valve, the oil thus flowing into the second cylinder chamber 22 through the contraction-side passage 24 and hence generating damping force.

When the speed of the piston 18 is in a high speed region, the respective outer peripheral portions of the disk valves 25, 26 and 27 which are provided at the downstream end of the extension-side passage 23 are bent so as to open the valve, thus generating damping force.

Figure 7:
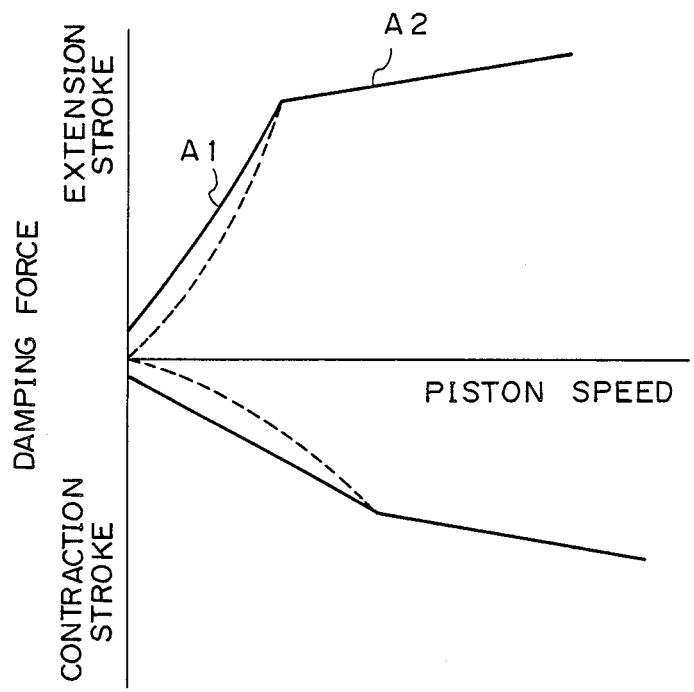
FIG. 7 is a chart showing the characteristics of the valve mechanism illustrated in FIG. 4, which shows the relationship between the piston speed and the damping force.

The characteristics of the valve mechanism according to this embodiment are shown in FIG. 7. In the chart of FIG. 7, the line A1 shows the characteristics of the damping force generated by opening the first disk valve 25' provided at the downstream end of the contraction-side passage 24 in a low piston speed region, while the line A2 shows the characteristics of the damping force generated by opening the disk valves 25, 26 and 27 provided at the downstream end of the extension-side passage 23 in a high piston speed region. It should be noted that the chain line shows the damping characteristics of the conventional valve mechanism in which a fixed orifice is utilized.

The damping characteristics in a low piston speed region can be set as desired by varying the plate thickness of the first disk valves 25, 25' and the opening area of the second disk valves 26, 26'. The damping characteristics in a high piston speed region can be set as desired by varying the number of third valves 27, 27' provided.

It should be noted that substantially the same damping characteristics are obtained during the contraction and extension strokes because the same operation takes place during the two strokes, as described above (see the damping characteristics at the contraction stroke side in FIG. 7).

Although in the foregoing embodiment the second disk valves 26 and 26' are provided with the openings 26a and 26a', the present invention is not necessarily limited to this arrangement and it is only necessary to arrange the valve mechanism such that the portions X of the first disk valves 25 and 25' are bent so as to open the valve in a low piston speed region (e.g., only the second disk vales 26 and 26' need be provided with notches).

As has been described above in detail, the present invention provides a hydraulic shock absorber wherein a disk valve assembly which is formed by successively stacking up a first disk valve having arc-shaped or circumferentially extending openings provided therein at positions close to the inner periphery thereof, a second disk valve having notches which extend from the outer periphery thereof to the radially outer edges of the corresponding openings provided in the first disk valve, and a predetermined number of annular third disk valves is provided at the downstream end of each of the extension- and contraction-side passages which are formed in a piston. Accordingly, in a low piston speed region, the first and second disk valves in the disk valve assembly provided at the side of the piston which is remote from where the disk valve assembly is activated in a high piston speed region during the same stroke of the piston are caused to open the valve to thereby generate damping force.

Thus, it is possible to obtain a higher level of damping force in a low piston speed region than in the case of the conventional valve mechanism that uses a fixed orifice, and it is also possible to set damping characteristics as desired.

Although the present invention has been described in specific terms, it should be noted here that the described embodiment is not necessarily exclusive and that various changes and modifications may be imparted thereto without departing from the scope of the invention which is limited solely by the appended claims.

What is claimed is:

1. In a hydraulic shock absorber including a cylinder containing a hydraulic fluid, a piston slidably received in said cylinder and defining first and second fluid chambers in said cylinder, said piston having first and second opposite end faces respectively facing said first and second chambers, a piston rod secured at one end thereof to said piston and having another end extending outside said cylinder, and a damping force generating mechanism attached to said piston, the improvement wherein said damping force generating mechanism comprises:

a first passage formed in said piston and communicated with said first chamber and with a recess in said second end face of said piston;

a second passage formed in said piston and communicated with said second chamber and with a recess in said first end face of said piston;

a first disc valve assembly mounted on said second end face of said piston and having an inner peripheral portion secured to said piston and an outer peripheral portion deflectable to open and close said first passage;

a second disc valve assembly mounted on said first end face of said piston and having an inner peripheral portion secured to said piston and an outer peripheral portion deflectable to open and close said second passage; and each of said first and second disc valve assemblies comprising:

a first disc valve mounted on the respective said end face of said piston and having an opening communicated with said recess in said respective end face;

a second disc valve mounted on said first disc valve, said second disc valve having formed therein a fluid passage having a first end open to the respective said chamber at that side of said piston at which said each disc valve assembly is disposed and a second end open to an interfacial area between said first and second disc valves; and said first disc valve, upon said piston being moved in said cylinder in a direction into said respective chamber at speeds in a relatively low speed range, being deformable away from said second disc valve by a resultant pressure that is generated in said respective chamber and that is insufficient to deform said outer peripheral portion of the other said disc valve assembly disposed at the other said end face of said piston, such that hydraulic fluid is allowed to flow from said respective chamber and said fluid passage in said second disc valve, through a clearance defined between said first and second disc valves due to such deformation, and then into the other said chamber, thereby generating damping force with valve characteristics in said low speed range.

2. The improvement claimed in claim 1, wherein said fluid passage in said second disc valve includes a notch, said disk valve assembly further having a third disk valve which is mounted on said second disk valve.

3. The improvement claimed in claim 2, wherein said opening in said first disc valve extends arcuately, and said fluid passage in said second disc valve further includes an arcuately extending opening at a location radially outwardly of said opening in said first disc valve, and said notch extends from the outer periphery of said second disc valve to said opening therein.

* * * * *